US011841442B2

(12) United States Patent  
Cochran et al.

(10) Patent No.: US 11,841,442 B2  
(45) Date of Patent: Dec. 12, 2023

(54) DOPPLER TRACKING FOR SIGNALS OF OPPORTUNITY USING RATE-LINE DETECTION

(71) Applicant: General Dynamics Mission Systems, Inc., Fairfax, VA (US)

(72) Inventors: Bruce Cochran, Fairfax, VA (US); Ronald McCallister, Fairfax, VA (US); Steven Goisman, Fairfax, VA (US)

(73) Assignee: General Dynamics Mission Systems, Inc.

( * ) Notice: Subject to any disclaimer, the term of this patent is extended or adjusted under 35 U.S.C. 154(b) by 68 days.

(21) Appl. No.: 17/648,213

(22) Filed: Jan. 18, 2022

(65) Prior Publication Data

US 2023/0228885 A1    Jul. 20, 2023

(51) Int. Cl.
| | |
|---|---|
| *G01S 5/10* | (2006.01) |
| *G01S 19/25* | (2010.01) |
| *G01S 19/07* | (2010.01) |
| G01S 19/29 | (2010.01) |
| G01S 19/41 | (2010.01) |
| G01S 19/40 | (2010.01) |

(52) U.S. Cl.
CPC .......... *G01S 19/254* (2013.01); *G01S 19/07* (2013.01); *G01S 19/25* (2013.01); *G01S 19/29* (2013.01); *G01S 19/40* (2013.01); *G01S 19/41* (2013.01)

(58) Field of Classification Search
CPC ........ G01S 19/254; G01S 19/07; G01S 19/41; G01S 19/40; G01S 19/25
USPC ............. 342/357.78, 357.23, 357.24, 357.44
See application file for complete search history.

(56) References Cited

U.S. PATENT DOCUMENTS

| | | | | |
|---|---|---|---|---|
| 5,343,209 A | * | 8/1994 | Sennott | G01S 19/53 |
| | | | | 342/357.29 |
| 6,731,237 B2 | * | 5/2004 | Gustafson | G01C 21/1652 |
| | | | | 342/357.65 |
| 7,356,075 B2 | * | 4/2008 | Bergstrom | H04B 1/7075 |
| | | | | 375/150 |
| 8,724,757 B2 | * | 5/2014 | Cochran | H04L 7/0029 |
| | | | | 375/354 |
| 9,341,719 B2 | * | 5/2016 | Jarvis | G01S 19/24 |
| 10,222,479 B2 | * | 3/2019 | Jarvis | G01S 19/258 |
| 2019/0041527 A1 | * | 2/2019 | Gustafson | G01S 19/215 |
| 2023/0228850 A1 | * | 7/2023 | Cochran | G01S 5/0221 |
| | | | | 356/4.01 |

FOREIGN PATENT DOCUMENTS

| | | | | | |
|---|---|---|---|---|---|
| CN | 102809753 A | * | 12/2012 | ............. | G01S 19/09 |
| CN | 111884984 A | * | 11/2020 | ......... | H04L 27/2614 |
| EP | 2824479 A1 | * | 1/2015 | ............. | G01S 19/02 |

* cited by examiner

*Primary Examiner* — Chuong P Nguyen  
(74) *Attorney, Agent, or Firm* — LKGlobal | Lorenz & Kopf LLP

(57) ABSTRACT

An electromagnetic transmission carrying a bauded signal, such as a transmission from an orbiting satellite, is processed for Doppler shift analysis. The electromagnetic transmission is captured and a non-linear operation is performed to expose a cyclostationary feature of the captured transmission that defines a rate-line having a rate-line frequency that is related to the bauded signal and to the motion of the transmitter relative to the receiver. The rate-line frequency is tracked in time to generate data indicative of Doppler shift associated with the satellite. The data are then supplied to a tracking receiver.

18 Claims, 4 Drawing Sheets

DOPPLER TRACKING FOR SIGNALS OF OPPORTUNITY USING RATE-LINE DETECTION

TECHNICAL FIELD

This disclosure relates generally to radio frequency signal processing and more particularly to a signal processing technique for extracting Doppler shift information from cyclostationary features of radio frequency signals propagating from moving sources, such as orbiting satellites.

BACKGROUND

This section provides background information related to the present disclosure which is not necessarily prior art.

Currently, the Global Navigation Satellite System (GNSS) widely serves as the most frequently relied upon technology to provide positioning, navigation and timing services for a wide range of applications. The GNSS employs numerous constellations of satellites that broadcast accurately timed signals back to Earth. The GNSS receiver measures signal time of arrival differences among these satellites to perform triangulation. In this way, the location of the receiver can be accurately determined and used for positioning, navigation and timing.

While demonstrated to be highly effective, the GNSS is not foolproof. Satellite borne transmitters can fail and their signals can be interfered with both by jamming from intentional and unintentional human transmissions, and by space weather events, such as solar flares, coronal mass ejections, and electromagnetic impulses.

Accordingly, there is considerable interest in an alternate system for providing positioning, navigation and timing services. In this regard, the many the radio frequency signals broadcast from the thousands of satellites in orbit around the Earth (not just the GNSS satellites) represent signals of opportunity. If the orbit information of these satellites is known and the Doppler shift of their signals can be tracked, in theory it is possible to use this information to provide positioning, navigation and timing services.

However, it can be extremely difficult to acquire and track these signals of opportunity, particularly where insufficient information about the signal payload is known to be able to decode it. At first blush one might assume that the carrier frequency of the unknown satellite could be tracked, but often such is not the case. Modern satellite systems are typically designed to maximize the payload throughput, and this is frequently done by using an encoding scheme which maximizes the payload signal to noise ratio, at the expense of largely suppressing the carrier frequency. Thus if the carrier frequency is to be used for Doppler shift measurement, a significant effort in processing time is required.

To complicate matters further, these signals of opportunity often will be transmitting using encoding schemes that are difficult to detect without a priori information about how the message is encoded. Thus blind estimation techniques to extract useful tracking information from the signal payload also can take a long time, lots of processing and may ultimately prove ineffective.

SUMMARY

Compared with blind estimation, the disclosed technique can be performed virtually instantaneously. It works by detecting a cyclostationary feature of the signal of opportunity, such as the inner code chipping rate, and then tracking that detected feature to measure Doppler shift. The Doppler shift information is then readily usable by a receiver to provide positioning, navigation and/or timing services.

In addition to being extremely fast, the disclosed cyclostationary feature detection is possible even in cases where the broadcast signal itself is well below the noise floor.

The disclosed technique works well with virtually all orbiting satellites that exhibit Doppler shift relative to the receiver (e.g. relative to ground-based receivers) and can be applied to any bauded signal.

In accordance with one aspect of the present disclosure a method is provided for processing, for Doppler shift analysis, an electromagnetic transmission carrying a bauded signal from a transmitter that is in motion relative to a tracking receiver. The electromagnetic transmission is captured, and a non-linear operation is performed on the captured transmission to expose a cyclostationary feature of the captured transmission that defines a rate-line having a rate-line frequency that is related to the bauded signal and to the motion of the transmitter relative to the receiver. The rate-line frequency is tracked in time to generate Doppler shift data indicative of Doppler shift associated with the transmitter in motion. These data are then supplied to the data tracking receiver.

In accordance with another aspect, an apparatus is disclosed for processing an electromagnetic transmission carrying a bauded signal from a transmitter that is in motion relative to a tracking receiver. The apparatus includes an antenna port for capturing the electromagnetic transmission. Coupled to this port is a processor configured to perform a non-linear operation on the captured transmission to expose a cyclostationary feature of the captured transmission that defines a rate-line having a rate-line frequency that is related to the bauded signal and to the motion of the transmitter relative to the receiver. A circuit or process is included which detects the rate-line frequency and generates Doppler shift data indicative of the Doppler shift associated with the transmitter in motion. These data are supplied through an output port to the tracking receiver.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figure 1:
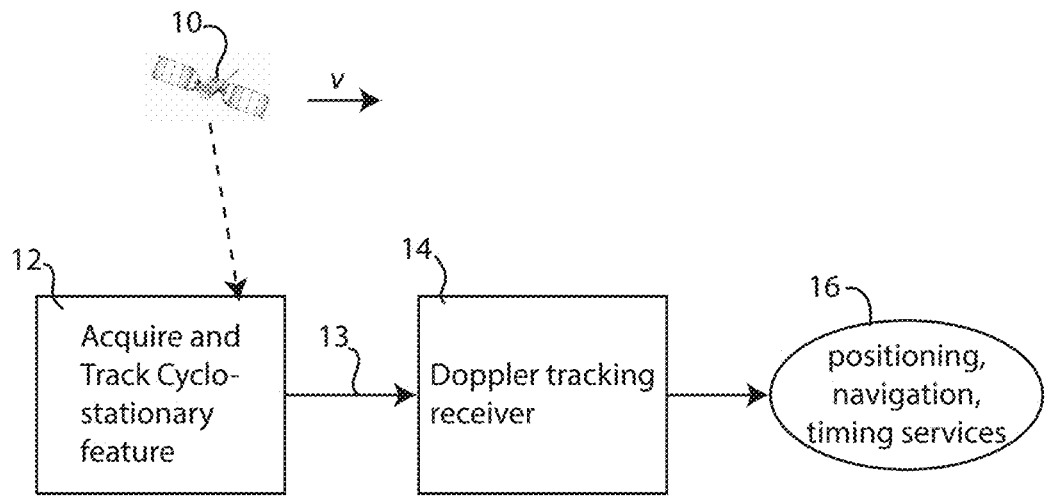
FIG. 1 is a simplified block diagram illustrating a high level context in which the disclosed signal processing technique may be implemented.

The disclosed signal processing system and method acquires and tracks a cyclostationary feature of a satellite transmission, and generates a unique Doppler effect signal, extracted from the cyclo stationary feature, which may be fed to a Doppler tracking receiver to provide positioning, navigation and timing services. FIG. 1 illustrates the basic configuration whereby the signal processing system 12 supplies this unique Doppler effect signal to the Doppler tracking receiver 14. As illustrated, a transmission from an orbiting satellite 10, or other moving object is first processed by the disclosed signal processing system 12, with the derived Doppler effect signal 13 being supplied to the Doppler tracking receiver of conventional design.

As more fully explained below, the cyclostationary feature extracted by the signal processing system 12 is not apparent in the satellite transmission spectrum ordinarily received by a Doppler tracking receiver. However, the extracted cyclostationary feature exhibits a fundamental frequency, referred to herein as the rate-line frequency, which exhibits Doppler shift and can be tracked. The fundamental frequency exhibits an apparent frequency shift (Doppler shift) because the satellite is moving across the sky with a relative velocity v as seen from a stationary ground-based receiver.

Cyclostationary Features

Cyclostationary features, although not visible in the transmission spectrum, exist in satellite and other communication systems which use a modulation encoding scheme that changes from one information state to the next using a predetermined time period for each bit of information imposed on the carrier. The rate at which the information state changes may generally be referred to as the baud rate. Some sophisticated satellite systems employ a spread spectrum encoding scheme in which a group of different carrier frequencies are sequentially used, changing from one carrier frequency to the next at some predetermined bauded time interval (referred to as the chip rate). Thus in each of these cases, the transmission can be considered a bauded signal, because the encoded information state or carrier frequency state changes at a rate determined a priori, and this encoding pattern repeats in a cyclic manner. Thus the term cyclostationary is used to describe these bauded signal encoding schemes.

It is therefore, the function of the disclosed signal processing system 12 to acquire a radio frequency signal transmission from satellite 10, extract a cyclostationary feature from the acquired signal and track changes in the cyclostationary feature as it undergoes time dilation (Doppler shift) because the satellite is moving relative to a stationary ground-based receiver. In effect the shifted frequency of the extracted cyclostationary feature provides a proxy for the Doppler shift information needed by the Doppler tracking receiver 14, which would otherwise need to rely on measuring shifts in the RF carrier frequency (often one or two orders of magnitude weaker). By supplying such robust Doppler shift information to a Doppler tracking receiver 14, the receiver is able to provide positioning, navigation and timing services 16, even in cases where the transmission carrier frequency is too weak for lock on. As noted, the Doppler tracking receiver 14 can be of any conventional design, however the source of Doppler shift information, i.e., from the disclosed signal processing system 12, is new, unique and not of conventional design.

Overview of Process

Figure 2:
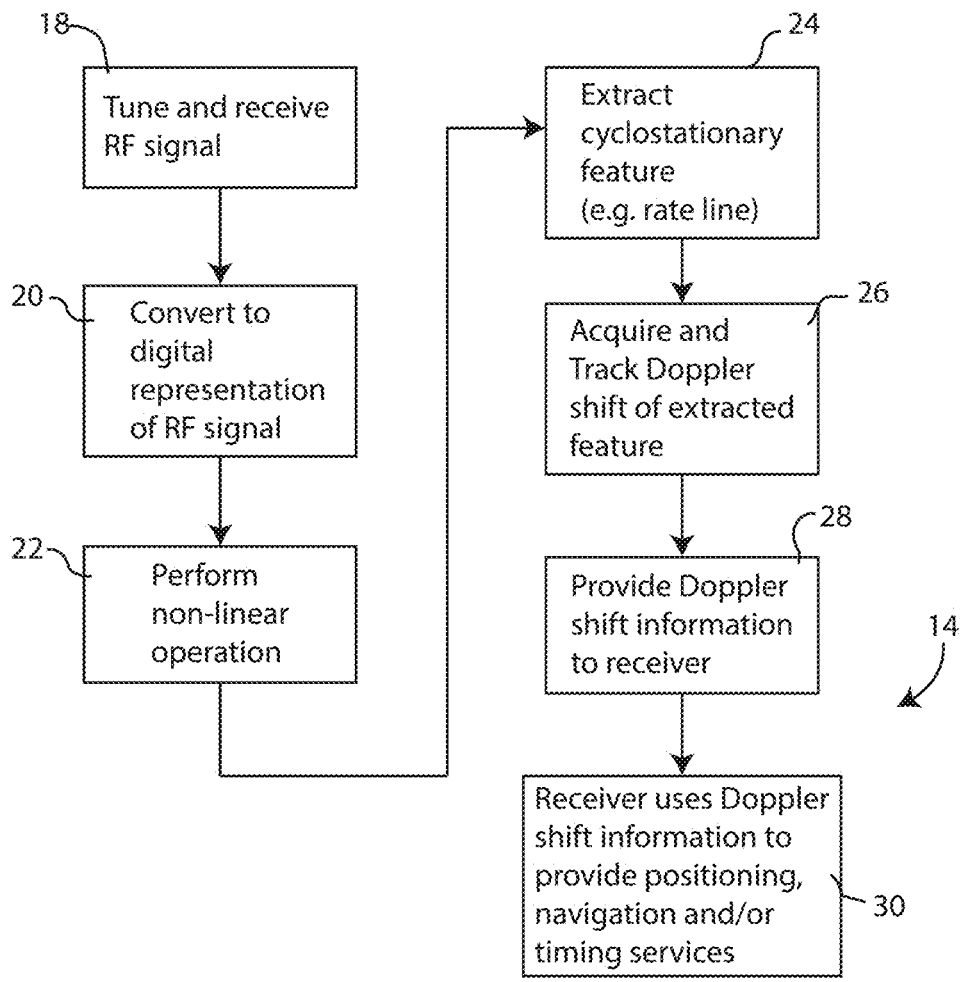
FIG. 2 is a flow chart providing an overview of core signal processing steps used to acquire and track Doppler shift of the cyclostationary feature (e.g., rate line)

FIG. 2 illustrates an overview of how the disclosed signal processing system 12 functions. As illustrated in FIG. 2, the signal processing steps may be performed upon the transmission from a single satellite, as was illustrated in FIG. 1. However, in many cases the signal processing system 12 will actually be operating on signals from a constellation or plurality of satellites. Exactly how this may be done will be described below with reference to FIG. 3.

The process begins at 18 by receiving and tuning the radio frequency transmission from one or more satellites. Receiving and tuning 18 may involve capturing the radio frequency signals using a suitable antenna and selecting a predetermined band of captured radio frequency signals, using a suitable bandpass filter. In many cases, all satellites within a given constellation may be operating on the same frequency or on a range of related frequencies. Thus a suitable filter bandwidth is chosen to capture the desired RF frequencies of interest. Of course, in cases where the precise RF frequencies are not known a priori, the bandwidth may be tuned wider or narrower, as needed, until useful information is being collected.

The captured band of RF frequency signals are then converted from analog to digital form as at 20, using a suitable analog-to-digital converter (ADC), to produce a digital representation of the RF signal(s). This digital representation may be more convenient for subsequent calculations and processing if converted to a baseband representation of the RF signal (by downsampling or other suitable process).

Next, as shown at 22, a non-linear operation is performed on the digital representation of the RF signal(s). Use of a non-linear operation produces new frequencies (i.e., in frequencies addition to those frequencies present in the RF signal(s). At least one of these newly created frequencies corresponds to cyclostationary features inherent in the broadcast RF signals from the satellite(s), but not directly visible to a conventional energy detector of the type conventionally used to detect signal strength modulations of the RF transmission. In this disclosure the newly created frequencies are characterized as rate-line frequencies, corresponding to encoding scheme timing parameters such as baud rate, chip rate or the like.

Following the non-linear operation 22, the processor extracts the newly created rate-line frequencies corresponding to the cyclostationary feature(s) of interest. To separate the rate-line frequencies from other extraneous or spurious signals and noise, additional bandpass filtering may be employed. As noted, these rate-line signals are not apparent in the transmission spectrum, but are extracted by performing the non-linear operation. In essence, this rate-line is an artificial signal, nominally existing at a frequency corresponding to a cyclostationary feature of the waveform, but capable of being Doppler shifted if the satellite which broadcast the RF signal is moving relative to the receiver.

Taking advantage of the rate-line's susceptibility to Doppler shift, the processor at 26 acquires (identifies) the rate-line signal(s) present and begins tracking any frequency shift it may exhibit over time. Such frequency shift is highly correlated to the Doppler shift produced by the motion of the satellite relative to the receiver. Once sufficient data have been collected to determine a Doppler shift value, this information is supplied at 28 to the receiver.

The receiver, at 30, then uses this newly provided Doppler shift information to compute the location of the receiver, using this Doppler shift information and knowing a priori the Two-Line element (TLE) information regarding the known locations of the broadcasting satellite constellation. A priori knowledge of the TLE information is typically supplied by downloading to the receiver, where it is maintained as a catalog of space objects orbiting the Earth.

Figure 3:
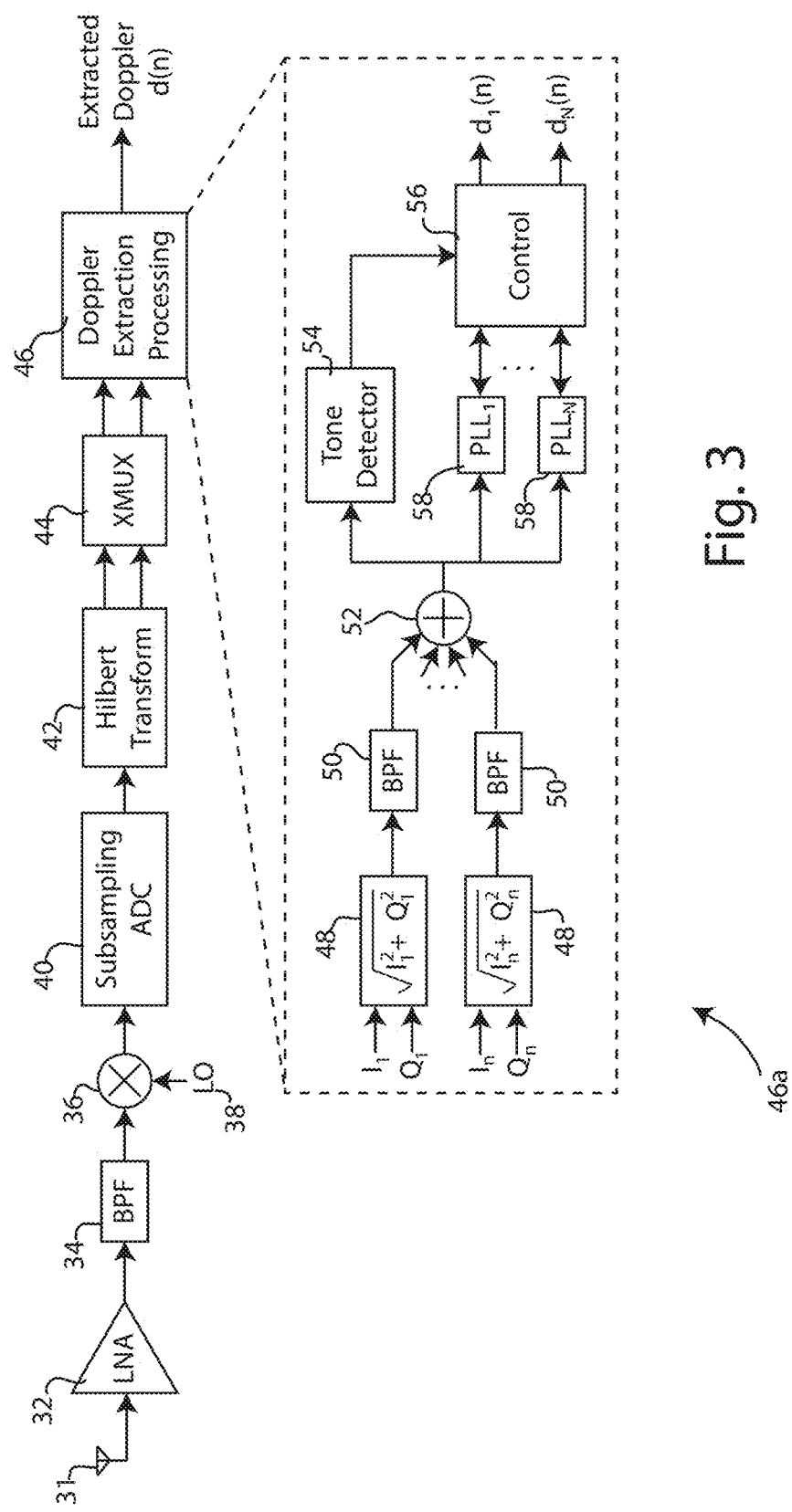
FIG. 3 is a block diagram illustrating an exemplary embodiment of the signal processing technique, useful for processing channelized signals from a plurality of satellites.
Figure 4:
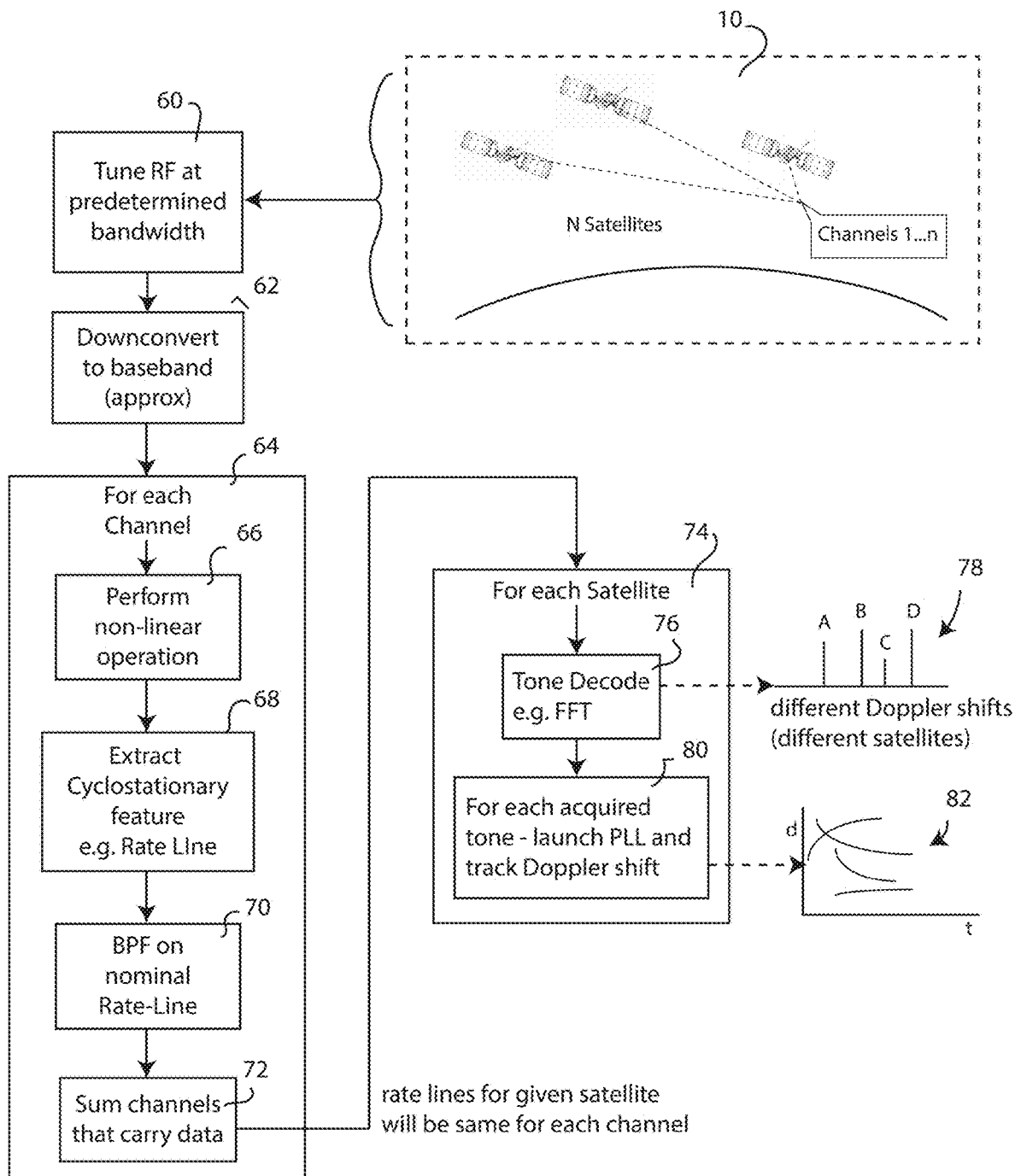
FIG. 4 is a flow chart diagram explaining the operation of the embodiment of FIG. 3.

While the above description has alluded to the fact that an exemplary embodiment will typically employ a constellation of a plurality of satellites, FIGS. 3 and 4 will now describe in detail that in many applications, not only will plural satellites be involved, but also multiple channels of information may be carried by each satellite. Thus in FIG. 4, a plurality of three satellites has been illustrated at 10, with the indication that each satellite broadcasts a signal that supports n-channels of information (channels 1 . . . n). The circuit block diagram of FIG. 3 shows how the disclosed signal processing system handles such information.

Exemplary Circuit Embodiment

Referring to FIG. 3, the receiver antenna 31 captures broadcast RF signals from all satellites within view and supplies them to a low noise amplifier 32. Having a good signal-to-noise ratio is important, so the low noise amplifier is deployed first in the signal chain. The low noise amplifier is sufficiently broadband to linearly amplify all received frequencies of interest as captured by the antenna.

Next the amplified signal is fed to bandpass filter 34, which may be designed to pass unimpeded the RF frequencies of interest, while blocking frequencies outside the range of frequencies used by the satellites of interest. For example, if the satellites provide a downlink transmission in the S-band (2-5 GHz), the passband of the bandpass filter 34 is designed to permit only that frequency range to pass. Of course, if a subset of the S-band is used, then the filter may be suitably narrowed. The purpose of the bandpass filter 34 is to improve system signal-to-noise ratio by blocking all noise signals that are outside the passband. In this regard, the sky is awash with noise, particularly during daylight hours, the Sun being one of the largest noise sources.

After bandpass filtering, the remaining signals are mixed at 36 with a local oscillator 38, which produces sum and difference heterodyne versions of the received signal. By suitably selecting (tuning) the local oscillator frequency, the difference heterodyne may be placed at or near baseband, where it is then processed by the subsampling analog to digital converter 40 to provide a digital representation of the received satellite signals. The sum heterodyne, if present, is superfluous and may be discarded.

In a practical implementation, the low noise amplifier 32, bandpass filter 34 and mixer 36 may be implemented using discrete integrated circuits, LC networks, of suitable design for handling the RF frequencies involved. After passing through the ADC 40, all of the remaining signal processing may be performed in the digital domain and thus may be implemented using gate array device (e.g., FPGA), digital signal processing integrated circuits, microprocessors or other digital processing circuits.

As noted above, one of the key processing steps in order to acquire and track a cyclostationary feature is to perform a nonlinear operation. In the embodiment illustrated in FIG. 3, this nonlinear operation is performed by converting the broadcast signal into I and Q components and then computing at 48 the vector magnitude (a non-linear operation). Other non-linear operations may also be used. In the illustrated embodiment, the I and Q components are extracted by applying a Hilbert transform 42 to the digitally sampled broadcast signal, producing two signals (I and Q signals) which are 90 degrees apart in phase. Once extracted, the I and Q signals are processed to compute the vector magnitude at 48. Alternative non-linear operations include applying a delay- and multiply operation, or applying a signal squaring operation.

The non-linear operation exposes the cyclostationary rate-line feature, producing a rate-line signal at a frequency fundamentally dictated by the bauded encoding scheme of the communication system, but altered in frequency by Doppler shift caused by the relative motion of the particular satellite making the transmission. Thus the rate-line frequency can be used as a proxy or measure of the satellite's Doppler shift and may ultimately be used to help identify which satellite is being observed. In the illustrated embodiment, a phase-locked loop-assisted tone detector 54 measures the frequency of the rate-line. This tone detection is part of the Doppler extraction processing 46, which is shown in greater detail at 46a. As will be next discussed, a portion of the Doppler extraction processing 46 shown in FIG. 3 is designed to support multichannel broadcasts and concurrent processing of multiple satellites.

Support for Multichannel Broadcasts and Concurrent Processing of Multiple Satellites Many satellite communications systems employ a channelized communication architecture, where each satellite is capable of communicating plural message streams or payloads that are separated in some fashion. Typical channelization methods include packetizing, frequency division multiplexing and time division multiplexing. These communication architectures can be quite sophisticated. For example, an example satellite system network may use the S-band for satellite-to-user transmission (forward downlink). The utilized bandwidth is divided into plural frequency domain multiplexed (FDM) channels. Thus the channelized transmission can support different messages on each of the plural channels. Other satellite systems may use other architectures.

Currently in orbit around the Earth are thousands of satellite communications systems. Thus at any given time potentially hundreds of satellite signals will impinge on the antenna 31 of the signal processing system of FIG. 3. The satellites producing signals visible to antenna 31 are likely to be positioned at different locations across the sky and will be traveling at different relative velocities to antenna 31. Thus these satellites will quite likely exhibit different Doppler shifts.

The embodiment illustrated in FIG. 3 is thus configured to concurrently process received signals from plural satellites, and to extract rate-line information from each channel of each satellite transmission within the passband of bandpass filter 34. To do this, a transmultiplexer 44 is used, to convert the channelized information from the domain in which it was multiplexed for transmission (e.g. FDM) into a domain that can be more conveniently processed by the non-linear operation. Essentially, the transmultiplexer 44 converts from frequency domain multiplexing to time domain multiplexing. In this way the I and Q signals from each of the individual channels may be time-aligned, so that the respective rate-line frequencies of all channels are all in phase and thus capable of being meaningfully summed.

The Doppler signal extraction process 46, illustrated in more detail at 46a, operates on the I and Q signals from each of the individual channels. To each I and Q signal, the non-linear process 48 is performed to generate a plurality of rate-line signals. Thereafter the rate-line signals are bandpass filtered at 50 and summed at 52. The bandpass filters at 50 have filter bandwidths chosen to pass frequencies in the expected range of the rate-line frequencies associated with the satellite communication system. Summing the rate-line signals in summer 52 effectively boosts the signal strength of the rate-line signal for a given satellite by adding each channel's contribution to the collective, thereby producing a more robust representation of the rate-line for that satellite.

Of course, if signals from plural satellites are captured by antenna 31 and processed as described above, it is likely that each satellite will exhibit different rate-line frequencies, due to differences in the respective Doppler shifts. Thus the output of summer 52 can be expected to contain plural rate-line frequencies, one for each satellite. To separate these respective rate-line frequencies into data for each satellite, the frequency of each rate-line is detected by tone detector 54 and a phase-locked loop 58 process is instantiated by control processor 56 for each different frequency. The phase-locked loop 58 process, by comparing output to input, helps smooth out minor fluctuations from one reading to the next, thereby producing a stable measure of the rate-line frequency. In this way rate-line data for each satellite can be acquired and tracked over time and ultimately output as a data stream giving a different Doppler shift value $d_1(n)$ to $d_N(n)$ for each satellite. This Doppler shift data stream is then fed to the Doppler tracking receiver 14 (FIG. 1) where the information is used to provide positioning, navigation and/or timing services, as at step 30 (FIG. 2).

As noted earlier, these rate-line signals are not seen in the satellite transmission spectrum, and yet they can provide a considerably more robust measure of satellite Doppler shift. By way of example, the rate-line of an exemplary Doppler shifted satellite signal may typically be in the low MHz range, for example on the order of 1 MHz. This low MHz. rate-line tone is far below the 2500 MHz carrier frequency and thus not seen within the spectrum captured by antenna 31 and processed through bandpass filter 34. The doppler shift of both frequencies from the satellite velocity would be relative to the detected frequencies (hence the 1 MHz doppler would be approximately 2500 times less than the carrier frequency, i.e. 10 Hz doppler for 1 MHz vs. 25 KHz for carrier).

Signal Processing Steps

FIG. 4 illustrates the disclosed signal processing method, as applied to signals captured by the antenna 31 (FIG. 3). Signals in the frequency range of interest are tuned at 60, which includes employment of bandpass filter 34 (FIG. 3) to screen out signals outside the range of frequencies of interest. As shown at 10, the process is designed to work with signals captured from plural satellites, each providing a multichannel transmission.

The tuning process may also include downconverting the received signals to baseband at 62. The downconversion step may be implemented by using the mixer 36 and local oscillator 38 (FIG. 3). Downconversion allows the received signals to be more readily digitized, as by ADC 40 (FIG. 3). While downconversion has been illustrated here and in FIG. 3, given suitably fast ADC circuitry, it is possible to digitize the received RF signals directly (without mixer and local oscillator) and through such direct conversion produce the baseband data in the digital domain.

Then, for each channel of a transmission being processed, the sequence of steps shown generally at 64 are performed. Included in these steps are performing a non-linear operation 66 upon the signals from each channel. The non-linear processing may be performed by suitable computation such as computing the vector magnitude of I and Q phases of the signals for each channel, as implemented at 48 (FIG. 3) with the aid of the transmultiplexer 44 (FIG. 3).

Cyclostationary features, such as rate-line signals are extracted at 68, this being the resultant output of the non-linear operation performed at 66. Bandpass filtering is then performed at 70, using a bandpass filter (or bank of bandpass filters) 50 (FIG. 3) centered on the nominal rate-line frequency expected from the communication system's bauded signal and allowing sufficient bandwidth to pass frequencies bearing a reasonable positive or negative Doppler shift.

The resultant rate-line signals for each channel are time aligned and their amplitudes are summed at 72 to produce a collective rate-line value representing the Doppler shift exhibited by the satellite which made the channelized transmission. In this regard, the rate-lines for any given satellite will be the same for each channel within the transmission, because the transmitter producing the channelized transmission is onboard the moving satellite and thus inherits its Doppler shift.

In the case where signals from plural satellites are captured by antenna 31 (FIG. 3), the steps shown generally at 74 are performed for each satellite. These steps include decoding the frequency (tone) of each set of channelized rate-lines. Such decoding may be performed using a Fast Fourier Transform (FFT). Such tone decoding will likely produce several different rate-line frequencies, as the frequencies are Doppler-shift-dependent and the plurality of satellites will quite probably exhibit different velocities relative to the ground-based receiver. An exemplary frequency plot of different rate-lines is shown at 78, as rate-lines A, B, C and D.

For each decoded rate-line tone, the process instantiates or launches a frequency tracking process, such as a phase-locked loop process 58 (FIG. 3) which will track the rate-lines over time, as illustrated at 82. As illustrated at 82, the individual Doppler shift frequencies may change over time as a particular satellite moves toward and then away from the ground-based receiver.

Exemplary Signals Corresponding to Signal Processing Steps

Figure 5:
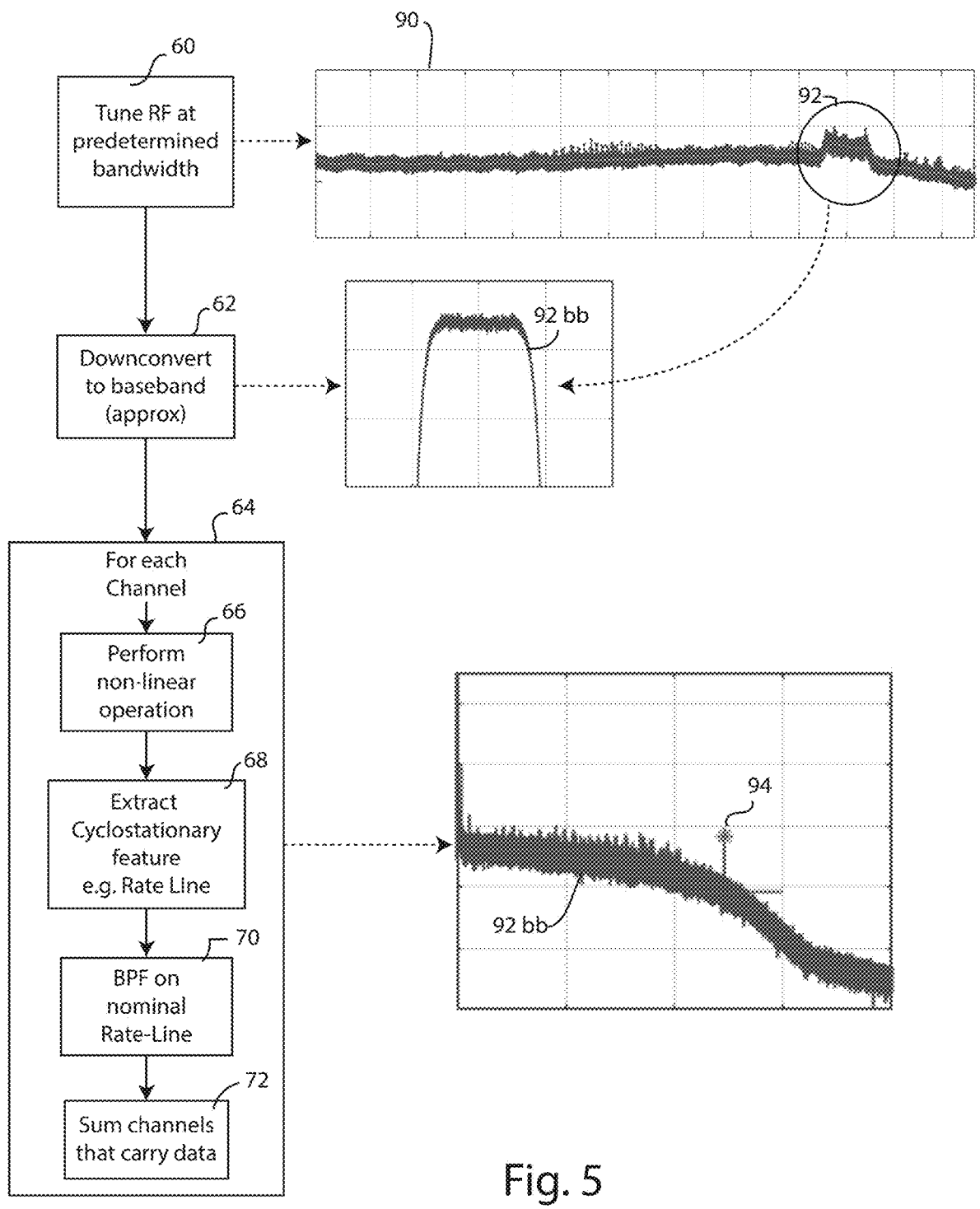
FIG. 5 depicts various exemplary waveforms corresponding to selected processing blocks from the flow chart of FIG. 4.

FIG. 5 shows some of the exemplary signals occurring at various steps of the disclosed signal processing method of FIG. 4. These steps also generally follow the operation of the embodiment of FIG. 3, as those steps would pertain to processing of a single satellite transmission captured by antenna 31.

As at step 60, when the received RF signal is captured by antenna 31 and filtered by BPF 34, the exemplary S band signal appears as shown at 90, with the transmission signal of interest shown at 92. At step 62 once the signal is down-converted to baseband, the signal of interest appears as shown at 92bb.

Then for each channel (of a channelized transmission), the steps at 64 are performed to extract from the baseband signal a rate-line signal 94. The steps at 64 include performing the non-linear operation 66 and extracting the cyclostationary feature at 68 (rate-line 94).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method of processing, for Doppler shift analysis, an electromagnetic transmission carrying a bauded signal from a transmitter that is in motion relative to a tracking receiver, comprising:

capturing the electromagnetic transmission;

performing a non-linear operation on the captured transmission to expose a cyclostationary feature of the captured transmission that defines a rate-line having a rate-line frequency that is related to the bauded signal and to the motion of the transmitter relative to the receiver, wherein the non-linear operation is selected from the group consisting of: generating in-phase and quadrature signals from the electromagnetic transmission and computing a magnitude of the in-phase and quadrature signals; performing a delay- and multiply operation; applying signal squaring operation; and combinations thereof;

tracking the rate-line frequency in time to generate Doppler shift data indicative of Doppler shift associated with the transmitter in motion; and supplying the Doppler data to the tracking receiver.

2. The method of claim 1 wherein the transmitter is carried by an orbiting satellite.

3. The method of claim 2 further comprising using a common antenna system to capture electromagnetic transmissions from a plurality of satellites each moving according to its own orbital trajectory and generating Doppler shift data for each satellite by performing said non-linear operation on transmissions from each satellite.

4. The method of claim 1 further comprising converting the electromagnetic transmission into digital data and performing the non-linear operation on the digital data.

5. The method of claim 1 further comprising defining a channelized electromagnetic transmission and separating the channelized electromagnetic transmission into a plurality of time-aligned signals and performing the non-linear operation on the plurality of time-aligned signals to produce plural rate-lines each having a rate-line frequency.

6. The method of claim 5 further comprising summing the plural rate-lines and tracking the summed rate-line to generate the Doppler shift data indicative of Doppler shift associated with the transmitter in motion.

7. The method of claim 1 wherein tracking the rate-line frequency in time is performed using a phase-locked loop to generate a stable Doppler shift data.

8. An apparatus for processing, for Doppler shift analysis, an electromagnetic transmission carrying a bauded signal from a transmitter that is in motion relative to a tracking receiver, comprising:

an antenna port for capturing the electromagnetic transmission;

a processor configured to perform a non-linear operation on the captured transmission to expose a cyclostationary feature of the captured transmission that defines a rate-line having a rate-line frequency that is related to the bauded signal and to the motion of the transmitter relative to the receiver, wherein the non-linear operation is selected from the group consisting of: generating in-phase and quadrature signals from the electromagnetic transmission and computing a magnitude of the in-phase and quadrature signals; performing a delay- and multiply operation; applying a signal squaring operation; and combinations thereof;

a circuit that detects the rate-line frequency and generates Doppler shift data indicative of the Doppler shift associated with the transmitter in motion; and an output port that supplies the Doppler shift data to the tracking receiver.

9. The apparatus of claim 8 further comprising a downconverter to convert the captured transmission to a lower frequency.

10. The apparatus of claim 9 wherein the downconverter includes a mixer and local oscillator.

11. The apparatus of claim 9 wherein the downconverter is implemented as a process in the digital domain.

12. The apparatus of claim 8 further comprising signal transformation processor that generates based on the captured transmission a first signal at a first phase angle and a second signal at a second phase angle and wherein the processor is configured to perform the non-linear operation by operating on the first and second signals.

13. The apparatus of claim 12 wherein the signal transformation processor performs a Hilbert transformation.

14. The apparatus of claim 8 wherein the electromagnetic transmission is channelized into a plurality of time-aligned signals and the apparatus further comprises a transmultiplexer to extract a plurality of time-aligned signals, one for each channel.

15. The apparatus of claim 14 wherein the processor performs the non-linear operation on each of the plurality of time-aligned signals to produce plural rate-lines each having a rate-line frequency.

16. The apparatus of claim 15 further comprising a circuit that sums the plurality of time-aligned signals to produce a composite rate-line signal having a rate-line frequency.

17. The apparatus of claim 15 wherein the circuit that detects the rate-line frequency includes a phase-locked loop for each of the plural rate-lines.

18. The apparatus of claim 8 wherein the circuit that detects the rate-line frequency includes a phase-locked loop.

* * * * *